W. R. MILLER.
WRIST PIN.
APPLICATION FILED MAR. 27, 1920.
1,373,345.
Patented Mar. 29, 1921.
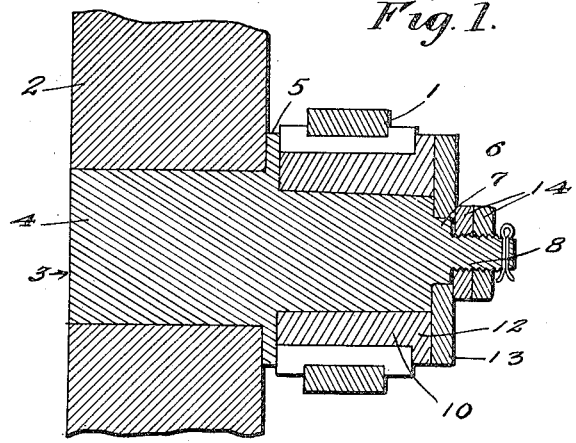
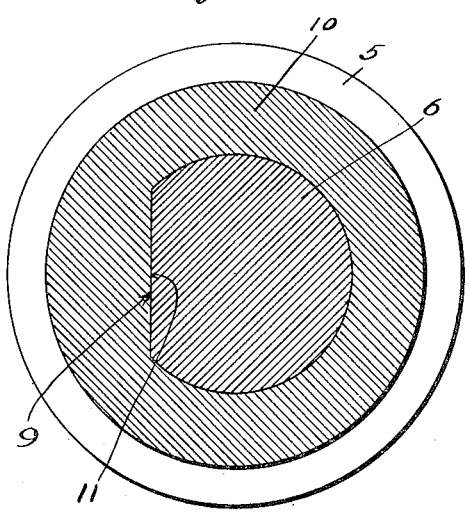
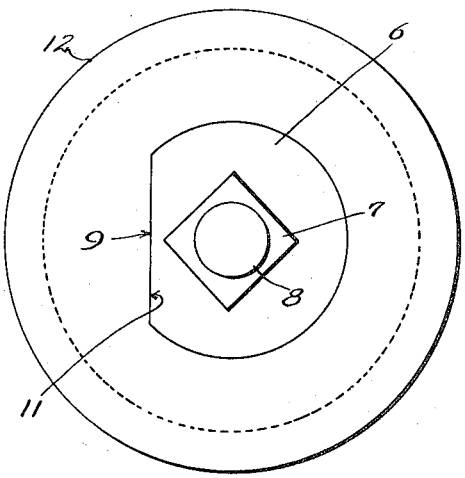
W. R. Miller
INVENTOR
BY *Victor J. Evans*
ATTORNEY
WITNESSES

UNITED STATES PATENT OFFICE.

WALTER R. MILLER, OF CHRISTIANA, PENNSYLVANIA.

WRIST-PIN.

1,373,345.  Specification of Letters Patent.  Patented Mar. 29, 1921.

Application filed March 27, 1920. Serial No. 369,209.

*To all whom it may concern:*

Be it known that I, WALTER R. MILLER, a citizen of the United States, residing at Christiana, in the county of Lancaster and State of Pennsylvania, have invented new and useful Improvements in Wrist-Pins, of which the following is a specification.

This invention relates to improvements in wrist pins for connecting the driving rod to the locomotive wheels and the principal object of the invention is to provide a removable part on the pin which may be removed and a larger one substituted to take up the wear on the rod brasses.

Another object of the invention is to provide means for preventing the removable part from rotating on the pin when the parts are in assembled position.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a sectional view showing the pin in use.

Fig. 2 is a cross section through the pin and its bushing.

Fig. 3 is a detail view.

In the drawings, 1 indicates a part of the locomotive drive rod, 2 the portion of the drive wheel which carries the wrist pin. This pin, indicated at 3, has its cylindrical part 4 pressed into the bore in the wheel by hydraulic pressure as usual. The pin is provided with a flange 5 which engages the outer face of the wheel around said bore. The projecting part 6 of the pin is reduced in size and is slightly tapered and at its end this part has formed thereon the square part 7 and the screw threaded part 8. One side of the part 6 is cut away to produce the flat face 9. A steel bushing 10 fits over this reduced part 6 and this bushing has its bore provided with a flat part 11, engaging the face 9 so that said bushing is prevented from rotating on the pin. The outer end of the bushing is provided with a flange 12. A washer plate 13 has a square bore which engages the square part 7 and the plate engages the outer end of the bushing to hold the same in place. The plate is held in position by means of the nuts 14 on the screw-threaded part 8.

As will be seen from Fig. 1 the brasses carried by the rod 1 engage said bushing 10 and when said brasses become worn it is simply necessary to remove the bushing 10 and substitute a larger one. Thus the wear in the rod brasses can be kept to a minimum and where split or sectional brasses are in use my invention will save the time and expense of reducing the brasses to fit the pin.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A wrist pin having a cylindrical portion for engaging the opening in the wheel and a reduced outer part, a flange provided on said pin and engaging the outer face of the wheel around the bore, the projecting part of said pin being reduced and slightly tapered at its end and having a square part, and a screw threaded part formed thereon, said reduced part having a flat portion thereon, a bushing engaging said reduced part and having a flat portion engaging the flat part of the reduced portion, a washer plate carried on the outer end of said pin and means for securing the plate on said pin.

In testimony whereof I affix my signature.

WALTER R. MILLER.